United States Patent
Liu

(10) Patent No.: US 9,128,001 B2
(45) Date of Patent: Sep. 8, 2015

(54) TESTING APPARATUS

(71) Applicants: HONG FU JIN PRECISION INDUSTRY (ShenZhen) CO., LTD., Shenzhen, Guangdong Province (CN); HON HAI PRECISION INDUSTRY CO., LTD., Tu-Cheng, New Taipei (TW)

(72) Inventor: Fu-Ming Liu, Shenzhen (CN)

(73) Assignees: HONG FU JIN PRECISION INDUSTRY (ShenZhen) CO., LTD., Shenzen (CN); HON HAI PRECISION INDUSTRY CO., LTD., New Taipei (TW)

( * ) Notice: Subject to any disclaimer, the term of this patent is extended or adjusted under 35 U.S.C. 154(b) by 352 days.

(21) Appl. No.: 13/626,990

(22) Filed: Sep. 26, 2012

(65) Prior Publication Data
US 2013/0167670 A1    Jul. 4, 2013

(30) Foreign Application Priority Data

Dec. 28, 2011  (CN) .......................... 2011 1 0446770

(51) Int. Cl.
*G01M 7/02*     (2006.01)
*G01D 11/16*    (2006.01)

(52) U.S. Cl.
CPC ............... *G01M 7/027* (2013.01); *G01D 11/16* (2013.01)

(58) Field of Classification Search
CPC ........ G01D 11/16; G01D 11/18; G01M 7/027
See application file for complete search history.

(56) References Cited

FOREIGN PATENT DOCUMENTS

SU          1465322 A  *  3/1989

* cited by examiner

*Primary Examiner* — Paul West
(74) *Attorney, Agent, or Firm* — Novak Druce Connolly Bove + Quigg LLP

(57) ABSTRACT

A testing apparatus includes a testing platform, a tray attached to the testing platform and substantially perpendicular to the testing platform, a pressing member substantially parallel to the testing platform and slidably attached to the tray, and a resilient member located between the tray and the pressing member. The pressing member is slidable relative to the tray between a first position and a second position. When the pressing member is located on the first position, a first distance is defined between the pressing member and the testing platform, for receiving an electronic device between the pressing member and the testing platform. When the pressing member is located on the second position, the resilient member is deformed, and a second distance, that is greater than the first distance is defined between the pressing member and the testing platform, for disengaging the electronic device from the testing platform.

17 Claims, 5 Drawing Sheets

TESTING APPARATUS

BACKGROUND

1. Technical Field

The present disclosure relates to testing apparatuses, more particularly to a testing apparatus for an electronic device.

2. Description of Related Art

An electronic device, such as a computer, often needs various tests, such as a vibration test or an impact test. During the testing, the electronic device is secured to a clamping device, and the clamping device is placed on a testing platform. Generally, the clamping device includes a securing post secured to the testing platform and a pressing post secured to the securing post. The electronic device is located between the securing post and the pressing post. However, the pressing post is often secured to the securing post by a plurality of screws, and using screws is laborious and time-consuming. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
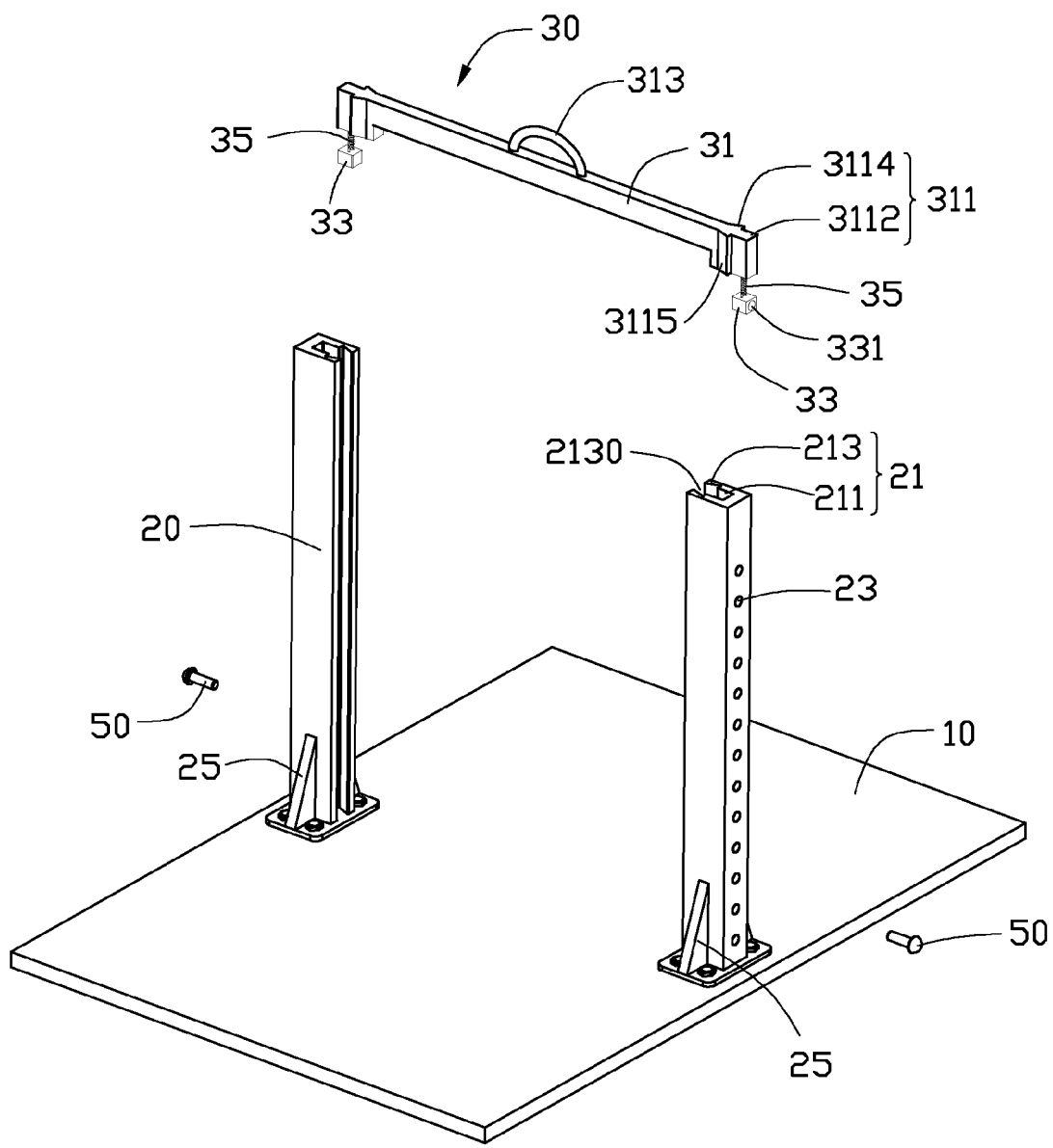
FIG. 1 is an exploded, isometric view of a testing apparatus in accordance with an embodiment.
Figure 3:
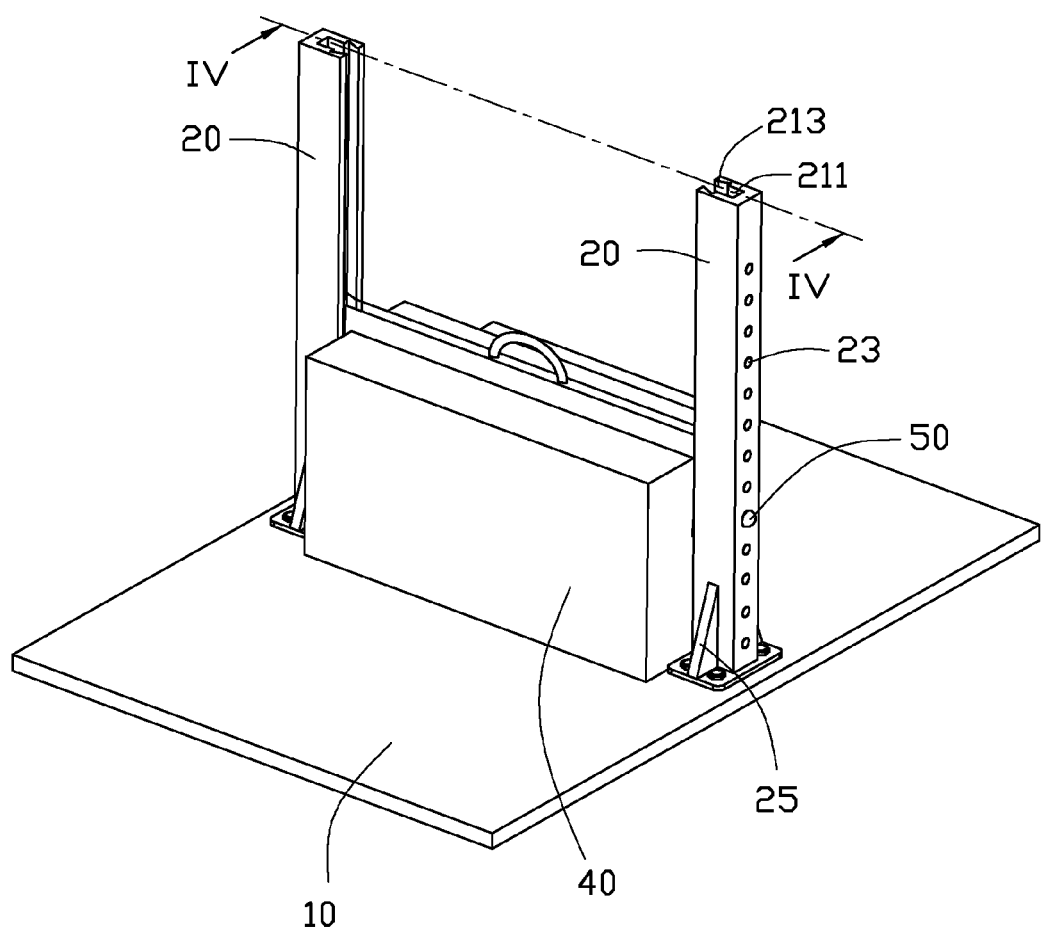
FIG. 3 is an assembled view of the testing apparatus and an electronic device in accordance with an embodiment.

FIG. 1 illustrates a testing apparatus in accordance with an embodiment for testing an electronic device 40 (see FIG. 3). The testing apparatus comprises a testing platform 10, two trays 20 attached to the testing platform 10, and a pressing member 30 attached to the two trays 20. In one embodiment, the two trays 20 are substantially parallel to each other and perpendicular to the testing platform 10.

Each of the two trays 20 defines a sliding slot 21 and a plurality of securing holes 23 communicating with the sliding slot 21. In one embodiment, the plurality of securing holes 23 are arranged at a straight line that is substantially perpendicular to the testing platform 10.

The sliding slot 21 comprises a first receiving portion 211 and a second receiving portion 213 communicating with the first receiving portion 211. In one embodiment, the first receiving portion 211 is substantially a rectangle, and the second receiving portion 213 comprises two opposite slanted surfaces (not labeled). Two strengthening ribs 25 are connected to the bottom of each of the two trays 20. In one embodiment, each of the strengthening ribs 25 is substantially a triangle.

The pressing member 30 comprises a pressing post 31, two positioning blocks 33, and two resilient members 35 located between the pressing post 31 and each of the two positioning blocks 33. In one embodiment, each of the two resilient members 35 is an extension spring. Two sliding portions 311 are located on opposite sides of the pressing post 31, and a handle 313 is located on the center portion of the pressing post 31. Each of the two sliding portions 311 comprises a first sliding portion 3112 and two second sliding portions 3114 arranged at opposite sides of the first sliding portion 3112. In one embodiment, a cross-section of the first sliding portion 3112 is substantially a rectangle. Each of the two second sliding portions 3114 comprises a sliding portion slanted surface 3115 that is engaged with a receiving portion slanted surface 2130 of the second receiving portion 213. A positioning hole 331 is defined in each of the two positioning blocks 33 and corresponds to the plurality of securing holes 23. A first end of each of the two resilient members 35 is secured to each of the two sliding portions 311, and a second of each of the two resilient members 35 is secured to each of the two positioning blocks 33.

Figure 2:
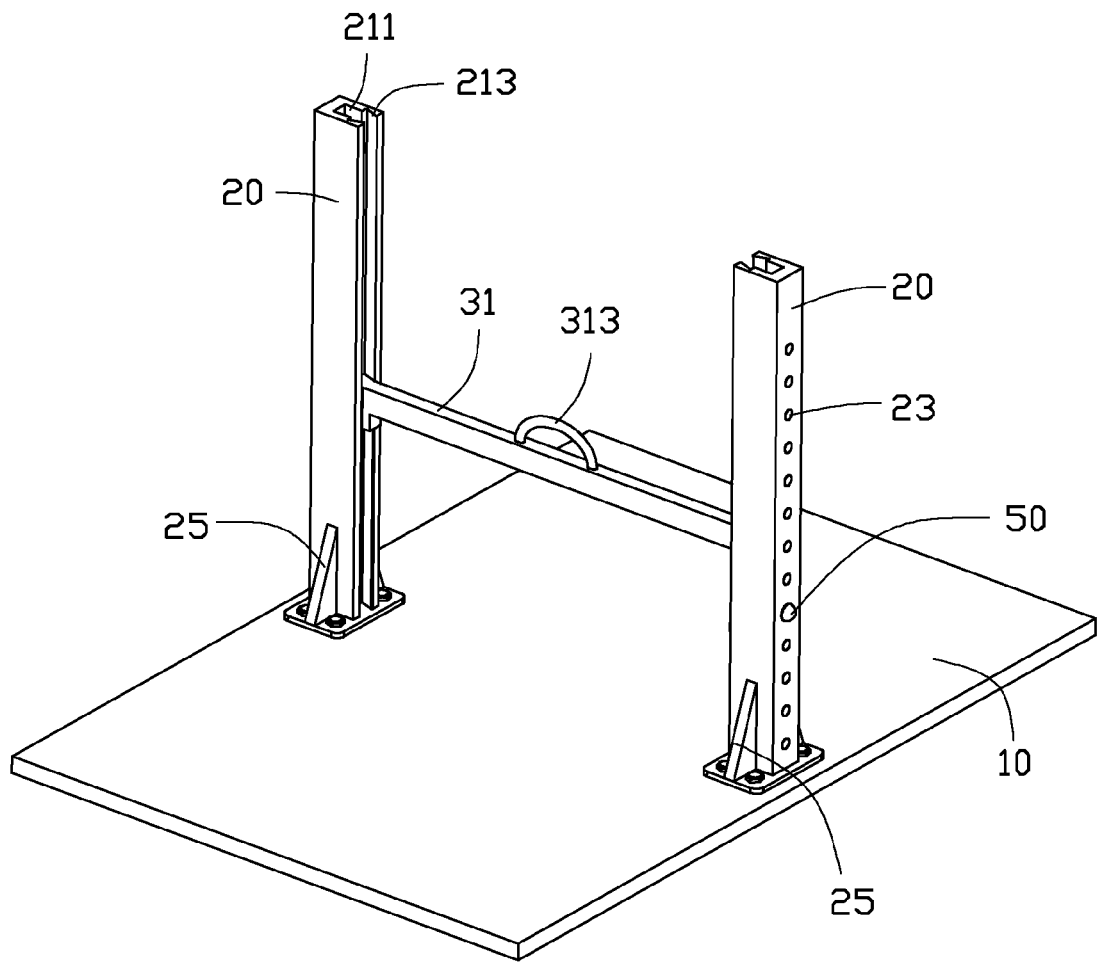
FIG. 2 is an assembled view of the testing apparatus of FIG. 1.

FIG. 2 illustrates an assembled view of the testing apparatus in accordance with an embodiment. In assembly, the pressing post 31 is located between the two trays 20, and the two sliding portions 311 is slid into the sliding slot 21 in a first direction substantially perpendicular to the testing platform 10. The first sliding portion 3112 and the positioning block 33 are together received in the first receiving portion 211. The sliding portion slanted surface 3115 abuts the two receiving portion slanted surfaces 2130 of the second receiving portion 213. The pressing post 31 is further moved in the first direction and towards the testing platform 10. When the two positioning blocks 33 reach a predetermined location, the positioning holes 331 are aligned with two of the plurality of securing holes 23. Two mounting members 50 are engaged in the two positioning holes 331 and the plurality of securing holes 23, to secure the two positioning blocks 33 to the trays 20.

Figure 4:
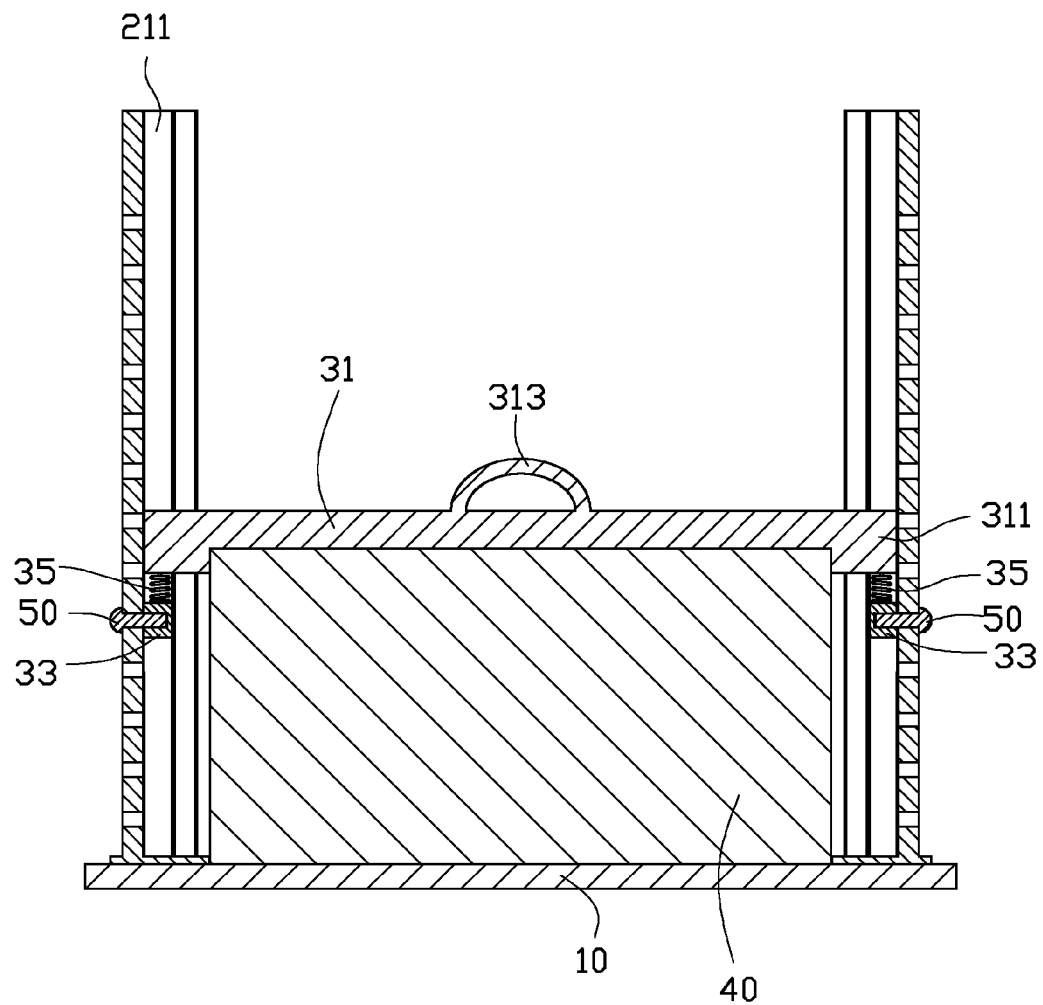
FIG. 4 is a cross-sectional view of FIG. 3, taken along a line IV-IV, and a pressing member abuts the electronic device.
Figure 5:
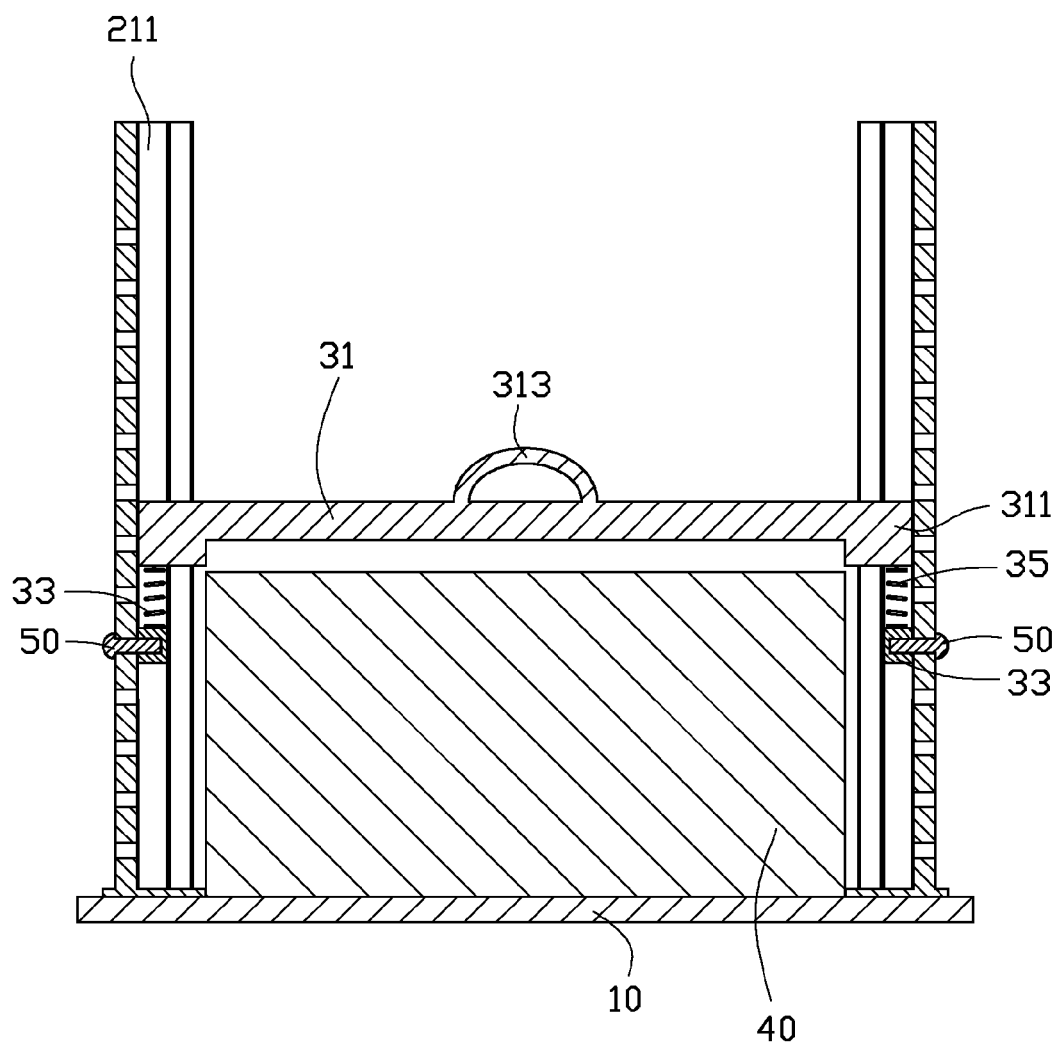
FIG. 5 is similar to FIG. 4, but the pressing member is disengaged from the electronic device.

In FIGS. 3-5, when the testing apparatus needs to position the electronic device 40, the pressing post 31 is moved upward and away from the testing platform 10. The two sliding portions 311 are slid in two of the sliding slots 21 relative to the two positioning blocks 33. The two resilient members 35 are deformed, and a distance between the pressing post 31 and the testing platform 10 is increased. The electronic device 40 is placed between the pressing post 31 and the testing platform 10. The two resilient members 35 are released to move the pressing post 31 downward, until the pressing post 31 abuts the electronic device 40. Therefore, the electronic device 40 can be secured between the pressing post 31 and the testing platform 10.

When the electronic device 40 needs to be disassembled, the pressing post 31 is moved upward and away from the testing platform 10. The two sliding portions 311 are slid in two of the sliding slots 21 relative to the two positioning blocks 33. The two resilient members 35 are deformed, and the pressing post 31 is disengaged from the electronic device 40. Thus, the electronic device 40 can be disengaged from the testing platform 10.

In one embodiment, the distance between the testing platform 10 and the pressing member 30 can be adjusted according to a height of the electronic device 40. When the distance between the testing platform 10 and the pressing member 30 needs to be adjusted, each of the positioning holes 331 is aligned with one of the plurality of securing holes 23 of each of the two trays 20. The mounting members 50 are engaged in each of the positioning holes 331 and the one of the plurality of securing holes 23 of each of the two trays 20, to secure the pressing member 30 to each of the two trays 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A testing apparatus comprising:
   a testing platform;
   a tray attached to the testing platform and defining a plurality of securing holes;
   a pressing member slidably attached to the tray and comprising a positioning block; a positioning hole defined in the positioning block and aligned with a securing hole of the plurality of securing holes, and a mounting member engaged in the positioning hole and the securing hole to secure the positioning block to the tray; and
   a resilient member located between the tray and the pressing member;
   wherein the pressing member is slidable relative to the tray in a first direction substantially perpendicular to the testing platform, the resilient member is deformed to position an electronic device between the pressing member and the testing platform, and the resilient member is released to engage the pressing member with the electronic device for preventing the electronic device from disengaging from the testing platform.

2. The testing apparatus of claim 1, wherein the plurality of securing holes are arranged at a straight line substantially perpendicular to the testing platform.

3. The testing apparatus of claim 1, wherein a cross-section of the positioning block is substantially a rectangle.

4. The testing apparatus of claim 1, wherein the pressing member further comprises a pressing post, the pressing post comprises a sliding portion, a first end of the resilient member is attached to the sliding portion, and a second end of the resilient member is attached to the positioning block.

5. The testing apparatus of claim 4, wherein the tray defines a sliding slot, and the sliding portion is slidably received in the sliding slot.

6. The testing apparatus of claim 5, wherein the sliding slot comprises a first receiving portion and a second receiving portion communicating with the first receiving portion, the sliding portion comprises a first sliding portion and a second sliding portion connected to the first sliding portion, the first sliding portion is slidably received in the first receiving portion, and the second sliding portion is slidably received in the second receiving portion.

7. The testing apparatus of claim 6, wherein the second sliding portion comprises a sliding portion slanted surface, and the second receiving portion comprises a receiving portion slanted surface engaged with the sliding portion slanted surface.

8. The testing apparatus of claim 1, wherein the pressing member is substantially perpendicular to the tray.

9. The testing apparatus of claim 1, further comprising a strengthening rib, wherein the strengthening rib is attached to a bottom portion of the tray.

10. A testing apparatus comprising:
    a testing platform;
    a tray attached to the testing platform and substantially perpendicular to the testing platform; the tray defining a sliding slot, the sliding slot comprising a first receiving portion and a second receiving portion communicating with the first receiving portion;
    a pressing member substantially parallel to the testing platform and slidably attached to the tray; the pressing member comprising a sliding portion; the sliding portion comprising a first sliding portion and a second sliding portion connected to the first sliding portion, the first sliding portion slidably received in the first receiving portion, and the second sliding portion slidably received in the second receiving portion; and
    a resilient member located between the tray and the pressing member;
    wherein the pressing member is slidable relative to the tray between a first position and a second position, when the pressing member is located on the first position, a first distance is defined between the pressing member and the testing platform, the pressing member and the testing platform together holding an electronic device on the testing platform; when the pressing member is located on the second position, the resilient member is deformed, and a second distance, greater than the first distance, is defined between the pressing member and the testing platform, and the electronic device is removable from the testing platform.

11. The testing apparatus of claim 10, wherein a sliding direction of the pressing member is substantially perpendicular to the testing platform, and a direction of the resilient member deformed is substantially perpendicular to the testing platform.

12. The testing apparatus of claim 10, wherein the tray defines a plurality of securing holes, the pressing member comprises a positioning block, a positioning hole is defined in the positioning block and aligned with a securing hole of the plurality of securing holes, and a mounting member is engaged in the positioning hole and the securing hole to secure the positioning block to the tray.

13. The testing apparatus of claim 12, wherein the plurality of securing holes are arranged at a straight line substantially perpendicular to the testing platform.

14. The testing apparatus of claim 12, wherein a cross-section of the positioning block is substantially a rectangle.

15. The testing apparatus of claim 12, wherein the pressing member further comprises a pressing post, the sliding portion is located on the pressing post, a first end of the resilient member is attached to the sliding portion, and a second end of the resilient member is attached to the positioning block.

16. The testing apparatus of claim 12, wherein the second sliding portion comprises a sliding portion slanted surface, and the second receiving portion comprises a receiving portion slanted surface engaged with the sliding portion slanted surface.

17. The testing apparatus of claim 10, further comprising a strengthening rib, wherein the strengthening rib is attached to a bottom portion of the tray.

* * * * *